United States Patent [19]

Suzuki

[11] 4,446,488
[45] May 1, 1984

[54] VIDEO FORMAT SIGNAL RECORDING/REPRODUCING SYSTEM

[75] Inventor: Tsutomu Suzuki, Saitama, Japan

[73] Assignee: Pioneer Electronic Corporation, Tokyo, Japan

[21] Appl. No.: 300,096

[22] Filed: Sep. 8, 1981

[30] Foreign Application Priority Data

Sep. 8, 1980 [JP] Japan ............................ 55-124284

[51] Int. Cl.$^3$ ............................................. H04N 5/76
[52] U.S. Cl. ................................... 358/342; 358/144; 358/343
[58] Field of Search ............... 358/342, 343, 143, 144, 358/145, 147, 146, 341; 360/19.1, 10.1, 10.2, 10.3, 11.1, 9.1, 23, 27

[56] References Cited

U.S. PATENT DOCUMENTS

| | | | |
|---|---|---|---|
| 3,221,098 | 11/1965 | Feldman et al. | 358/143 |
| 3,493,674 | 2/1970 | Houghton | 358/147 |
| 3,865,973 | 2/1975 | Masuda et al. | 360/10.1 |
| 3,878,560 | 4/1975 | Ramage | 360/10.1 |
| 3,991,265 | 11/1976 | Fukuda et al. | 358/143 |
| 4,142,209 | 2/1979 | Hedlund et al. | 359/342 |
| 4,302,837 | 11/1981 | Tanaka et al. | 358/144 |
| 4,321,623 | 3/1982 | Rzeszewski | 358/144 |
| 4,353,090 | 10/1982 | Broadbent | 358/342 |
| 4,356,510 | 10/1982 | Nakayama | 358/143 |
| 4,361,849 | 11/1982 | Bolger | 358/342 X |

OTHER PUBLICATIONS

Maegele, "Digital Transmission of Two Television Sound Channels in Horizontal Blanking", Journal of the SMPTE, vol. 84, Feb. 1975, pp. 68–70.

Primary Examiner—Donald E. McElheny, Jr.
Attorney, Agent, or Firm—Sughrue, Mion, Zinn, MacPeak & Seas

[57] ABSTRACT

In a compound voice-image video format signal for displaying stationary image with audio accompaniment, the voice identification signal placed into the vertical blanking interval prior to a voice signal portion also indicates the stereo, bilingual or monaural nature of the audio signal.

6 Claims, 5 Drawing Figures

VIDEO FORMAT SIGNAL RECORDING/REPRODUCING SYSTEM

BACKGROUND OF THE INVENTION

This invention relates to a video format signal recording/reproducing system which employs a recording medium such as a video disc.

The so-called video format signal has a composition similar to a normal TV signal, comprising an information signal part which bears information (video information normally), and a horizontal/vertical synchronizing signal part, with a field signal consisting of a horizontal/vertical blanking part and the following information signal, and normally a pair of consecutive field signals forming one frame signal.

It is generally known to record a video format signal on a recording medium such as a video disc or video tape after FM modulation and then reproduce the video format signal at a desired time and place. In such a recording/reproducing system, it is also generally known to form a video frame including an image frame representing video information and a voice frame representing voice information and to insert the voice frame via time base compression into the information signal part of the video frame signal for recording and reproducing, so as to obtain an audio accompaniment corresponding to a reproduced stationary image.

However, in a recording/reproducing system for stationary images with voice accompaniment as described, it is necessary that the voice information be identified as to whether it is monaural, stereo or bilingual so that it is possible in voice reproduction to obtain not only a monaural audio portion but also stereo or bilingual (two-language).

In general, the composite video format signal will comprise a series of information signal portions separated by vertical blanking intervals. If a particular information signal portion will include video, or image, information, an image frame identification signal will be inserted into the immediately preceding vertical blanking interval. Alternatively, if the information signal portion will include voice, or audio, information, a voice frame identification signal will be inserted into the immediately preceding vertical blanking interval.

After FM modulation, the series of information and blanking intervals will be recorded onto a rotating video disc typically having a spiral track thereon. As the disc rotates, the image frame and voice frame portions of the video signal will be recorded at successive positions along the recording track.

Upon reproduction, the reproduction circuitry examines each vertical blanking interval to determine whether the next information signal is to be supplied to a video display or an audio processing circuit. The reproduced image is a stationary image so that the interruption in the flow of video information when an audio information portion is received will not detract from the display. A problem arises, however, if the reproduction circuitry must determine whether the sound represented by the received voice information signal is stereo, bilingual or monaural.

SUMMARY OF THE INVENTION

It is therefore a principal object of this invention to provide such a video format signal recording/reproducing system as will facilitate identification of whether the voice information of the voice frame in the video format signal is monaural, stereo or bilingual.

Briefly, in the video format signal recording/reproducing system according to this invention, the monaural, stereo or bilingual nature of the audio signal will be indicated by the position, duration and/or amplitude of the voice identification signal which is inserted into the vertical blanking interval of the video format signal prior to the information signal field into which the voice information has been inserted.

BRIEF DESCRIPTION OF THE DRAWINGS

The invention will now be described with reference to the accompanying drawings representing its preferred embodiment, in which.

DESCRIPTION OF THE PREFERRED EMBODIMENTS

Figure 1:
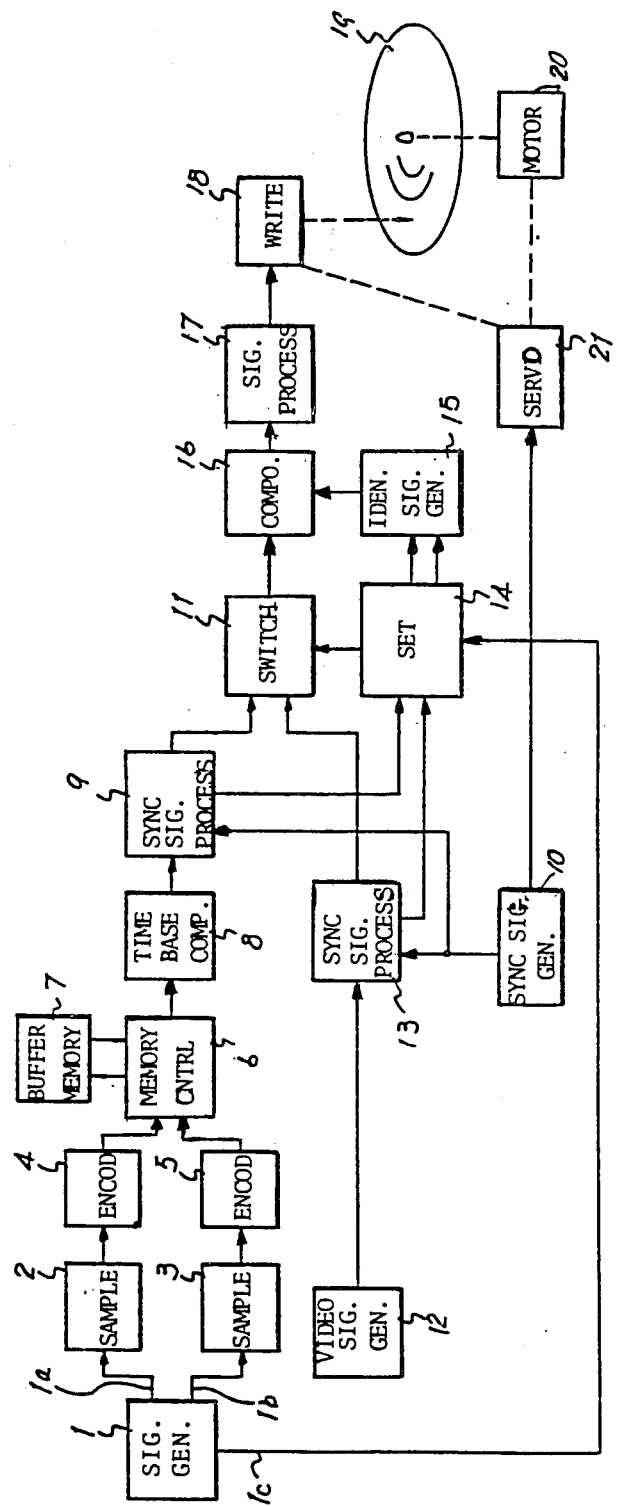
FIG. 1 is a block diagram representing a recorder in a video format signal recording/reproducing system according to this invention.

FIG. 1 represents a recorder in a video format signal recording/reproducing system according to the invention, wherein an audio signal generating circuit 1 generates an audio signal and provides this signal to recording and reproducing output terminals 1a, 1b. Where the audio signal is monaural, an output signal is generated on the output terminal 1a only; where it is stereo, an L signal is generated on the output terminal 1a and an R signal on the output terminal 1b, for example. If the audio is to be bilingual, a different language signal is generated on each of the output terminals 1a, 1b. A classification signal to indicate monaural, stereo or bilingual audio signals is generated on an output terminal 1c. In the preferred embodiment, this classification signal will be a signal on an appropriate one of 3 output classification signal lines, although it should be readily appreciated that other signal formats are possible.

The audio signal from the audio signal generating circuit 1 is sampled at a given period by sampling circuit 2, 3 and then encoded by PCM encoders 4, 5. The audio signal thus given in PCM is received by a memory control circuit 6 which arranges the bits in words of predetermined length and stores the words at various locations in a buffer memory 7 all in a manner well known in the art. Where the audio is monaural, 12 consecutive bits may constitute one word; where stereo or bilingual, each 6 bits incoming from each of the two channels may be combined into a single 12 bit word.

The voice information bit signals stored in the buffer memory 7 are subsequently read in sequence from memory 7 by the memory control circuit 6, subjected to a time base compression by a time base compression circuit 8 and then sent to a synchronizing signal processing circuit 9. The synchronizing signal processing circuit 9 forms the so-called voice frame or field according to video format by combining the voice information signal which has been subjected to time base compression with horizontal and vertical synchronizing signals from the synchronizing signal generator 10, and the voice frame video format signal is then delivered to one input terminal of a switching circuit 11.

On the other hand, a video generating circuit 12 generates a video signal bearing the image information obtainable through a TV camera. The video signal is combined with horizontal and vertical synchronizing signals by a further synchronizing signal processing circuit 13 to form a so-called image frame, and this image frame signal is then supplied to the other input terminal of the switching circuit 11. The generation of a video format signals by the insertion of synchronization signals into either a video information signal or a time base compressed voice signal is well known and does not constitute a part of the present invention, and no further detailed discussion will be provided herein.

A setting circuit 14 controls the switching circuit 11 to output the voice frame and the image frame signals received from synchronizing signal processing circuits 9, 13 in a proper sequence, and also generates a control signal to control an identification signal generating circuit 15 which generates an identification signal for the voice frame or the image frame. The setting circuit 14 sends a further control signal to the identification signal generating circuit 15 in accordance with the classification signal received from the audio signal generating circuit 1, thereby providing the circuit 15 with classification information indicating the monaural, stereo or bilingual nature of the voice signal, which classification information may then be included in the voice frame indentification signal generated from the identification signal generating circuit 15.

Figure 2:
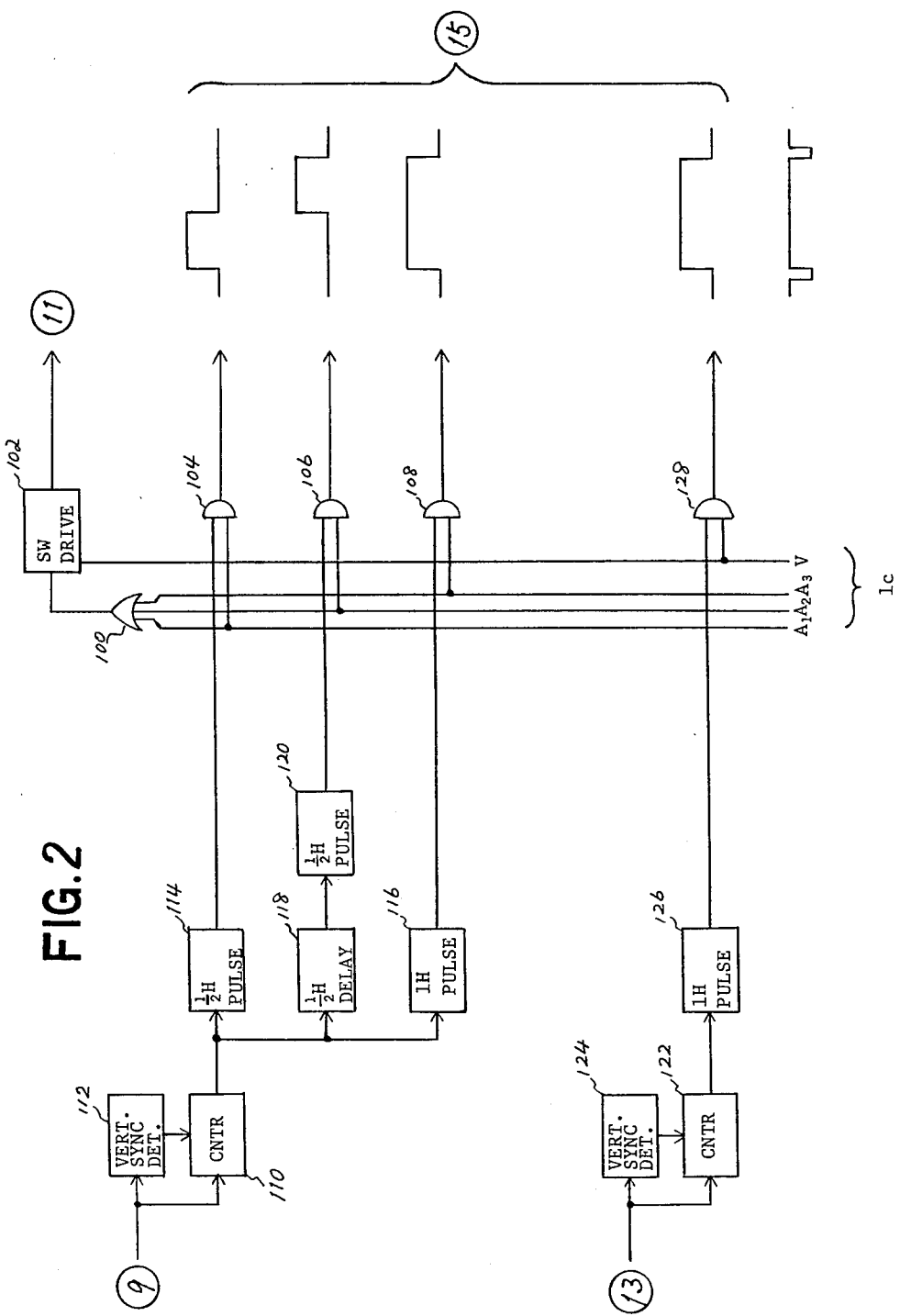
FIG. 2 is a brief block diagram of the set circuit 14 in FIG. 1.

FIG. 2 is a brief illustration of essential components of one example of the setting circuit 14 of FIG. 1. The circuit 14 receives the signal from output line 1c of the signal generator 1, with a signal on line A1 indicating stereo sound, a signal on line A2 indicating monaural sound and a signal on line A3 indicating bilingual sound. Any of these signals will, through OR gate 100, energize switch driving circuit 102 which will control the switch 11 to provide the voice information signal at its output. Each of these signals will also enable an appropriate one of gates 104, 106 or 108. In FIG. 2, the signal from output 1c of generator 1 in FIG. 1 is illustrated as including a fourth signal line V indicating that no audio signal is being generated and that the image frame signal should be provided at the output of switching circuit 11, but is should be realized that the signal on line V need not be provided from generator 1 but could be logically derived from the absence of a signal on any of lines A1–A3.

Counter 110 receives the video format voice frame signal, or at least the synchronizing pulses therefrom, from the signal process circuit 9, and counts the horizontal sync pulses. Counter 110 is preferably reset at a predetermined time in the vertical blanking interval by a reset pulse provided from vertical sync detector 112. An output from counter 110 signals the beginning of the 16th (or 279th) horizontal period, and this output is provided to pulse generators 114 and 116 and through H/2 delay 118 to pulse generator 120. As is clear from this arrangement, pulse generator 114 will provide an output pulse during the first half of the 16H interval, pulse generator 116 during the entire 16H interval, and pulse generator 120 during only the second half of the 16H interval, and these pulses will be passed to the signal generator 15 through an appropriate gate 104–108 whenever a voice classification signal is present on one of lines A1–A3. Upon receipt of one of these signals, generator 15 will generate a similar pulse and provide it to mixer 16 where it will be inserted into the 16H interval of the video format voice frame signal.

Counter 122 receives the image frame signal, or at least the synchronization signals therefrom, from signal processing circuit 13, and counts the horizontal sync pulses. Counter 122 is preferably reset at a predetermined time in each vertical blanking interval by a reset pulse from vertical sync detector 124. At a count corresponding to the beginning of the 16th (or 279th) horizontal interval, an output from counter 122 triggers the pulse generator 126 to provide a pulse to gate 128. If the V signal is present, this signal pulse will be passed to the signal generating circuit 15 to indicate that an image frame identification signal should be prepared and inserted into the 16H interval of the image frame signal.

Although the signals from gates 108 and 128 are identical in FIG. 2, they are provided on different signal lines so that the generator 15 will not generate a monaural voice classification signal in response to a signal from gate 128. The exact format of the image frame identification signal does not form a part of this invention and will not be described in detail herein. As but one example, the image frame identification signal could be a 24-bit digital signal inserted into the 16th and 17th H sections of the odd field (or the 279th and 280th H sections of the even field) in a manner well known in the art.

Rather than employ the logic circuitry shown in FIG. 2, it would be also possible for the setting circuit 14 to control the switching circuit 11 and the identification signal generating circuit 15 through a sequence control means such as a microcomputer so that the voice frame and image frame will be outputted in series from the mixing circuit 16 in a sequence programmed beforehand, and also so that each voice frame identification signal and image frame identification signal will be inserted into the blanking parts of the voice frame and the image frame.

A video format signal provided at the output of the mixing (compounding) circuit 16 is subjected to FM modulation at a signal processing circuit 17 and recorded onto a recording medium such as a video disc 19 as the video disc 19 is rotated by a motor 20 at a given rotational speed. The motor 20 and writing means 18 are controlled in a well known manner by a servo mechanism 21 according to a synchronizing signal from the synchronization signal generating circuit 10.

Figure 3:
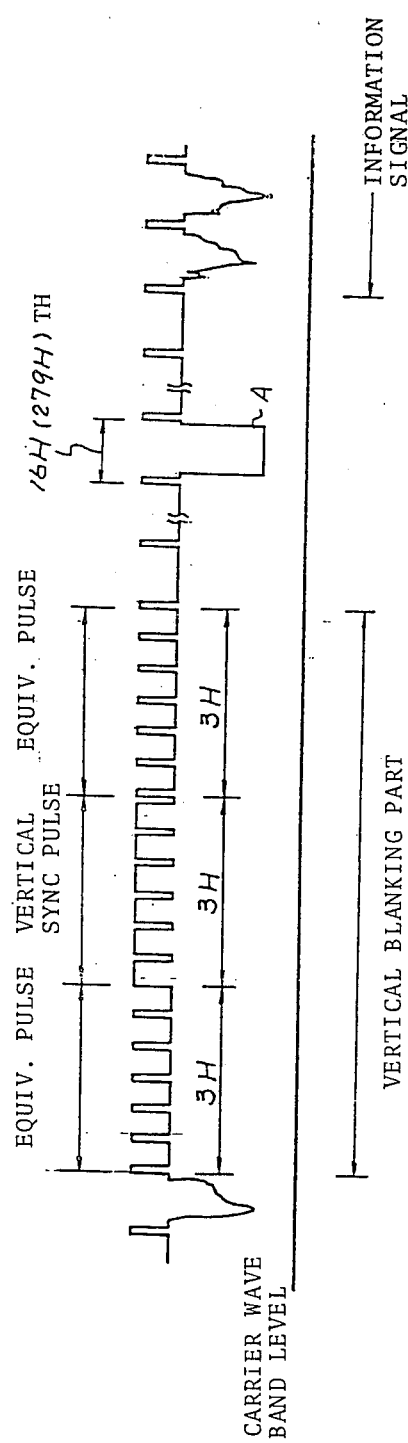
FIG. 3 is a wave-form view representing a constitution of a video format signal in the video format signal recording/reproducing system according to this invention.

FIG. 3 represents the vertical blanking part of an odd field from the end of the previous even field, and also shows a part of the information signal part of the video format voice frame signal provided at the output of the compounding circuit 16. In the drawing, a white flag pulse A which indicates the voice frame is inserted as a voice identification signal in the 16H period of the odd field. Assuming that the voice information included in the voice frame is stereo, the white flag pulse A as a voice identification signal can also provide voice classification information by limiting the pulse width of the white flag pulse A to about H/2 and inserting it in the first half of the H section. Similarly, the pulse width of the white flag pulse A can be limited to about H/2 and inserted into the latter half of the H section for bilingual, and the pulse width can be made almost equal to the H section as illustrated for monaural. If distinction between stereo and bilingual is unnecessary, the H/2 width white flag pulse can be inserted in either the first half or the second half of H section. In an even field, the white flag pulse A would be inserted in a similar manner in the 279th H section.

Figure 4:
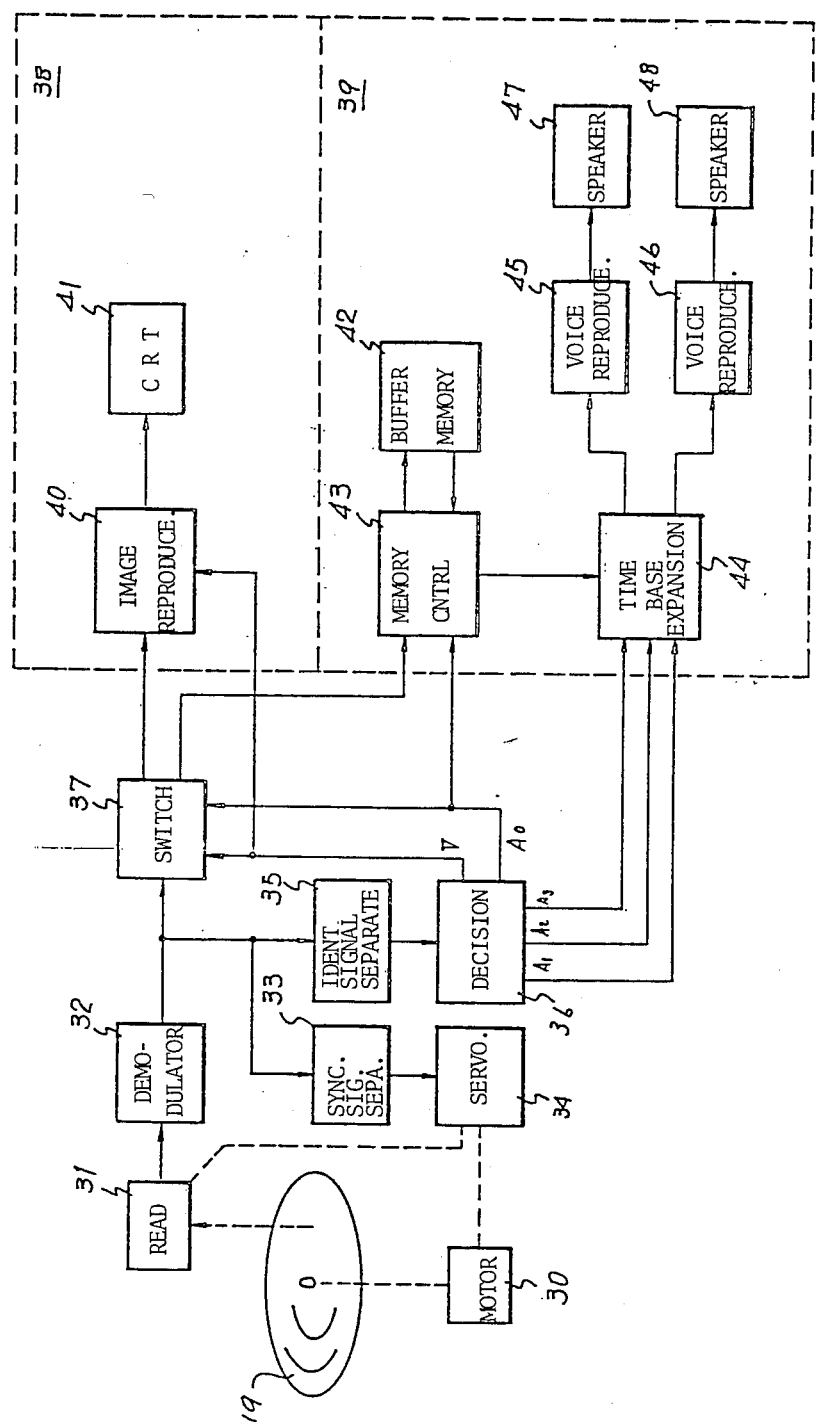
FIG. 4 is a block diagram representing a reproducer in the video format signal recording/reproducing system according to this invention.

A regenerator for reproducing the video format signal thus recorded is shown in FIG. 4.

In FIG. 4, a recorded modulated video format signal is read by a reading means 31 as the video disc 19 is rotated by a motor 30. The modulated video format signal obtainable through the reading means 31 is demodulated by a modulator circuit 32 to provide a video format signal as shown in FIG. 3.

A synchronizing signal separating circuit 33 separates the synchronizing signal from the video format signal and sends the sync signal to a servo mechanism 34, which controls the motor 30 and the reading means 31 as is well known. An identification signal separating circuit 35 then separates the voice frame and image frame identification signals from the video format signal and supplies these to a decision circuit 36. When the signal supplied from the identification signal separating circuit 35 is the image frame identification signal, the decision circuit 36 supplies a driving signal to a switching circuit 37 from an output terminal V, and the switching circuit 37 then supplies the received video format signal to an image reproduction processing circuit 38. On the other hand, when the identification signal from the identification signal separating circuit 35 is the voice frame identification signal, the decision circuit 36 provides a driving signal from an output terminal $A_0$ to thereby cause the switching circuit 37 to send the video format signal to a voice reproduction processing circuit 39. The decision circuit 36 further detects the monaural, stereo or bilingual classification information included in the voice frame identification signal and generates a logical signal on any one of output terminals $A_1$, $A_2$ and $A_3$ which indicates the voice classification.

Figure 5:
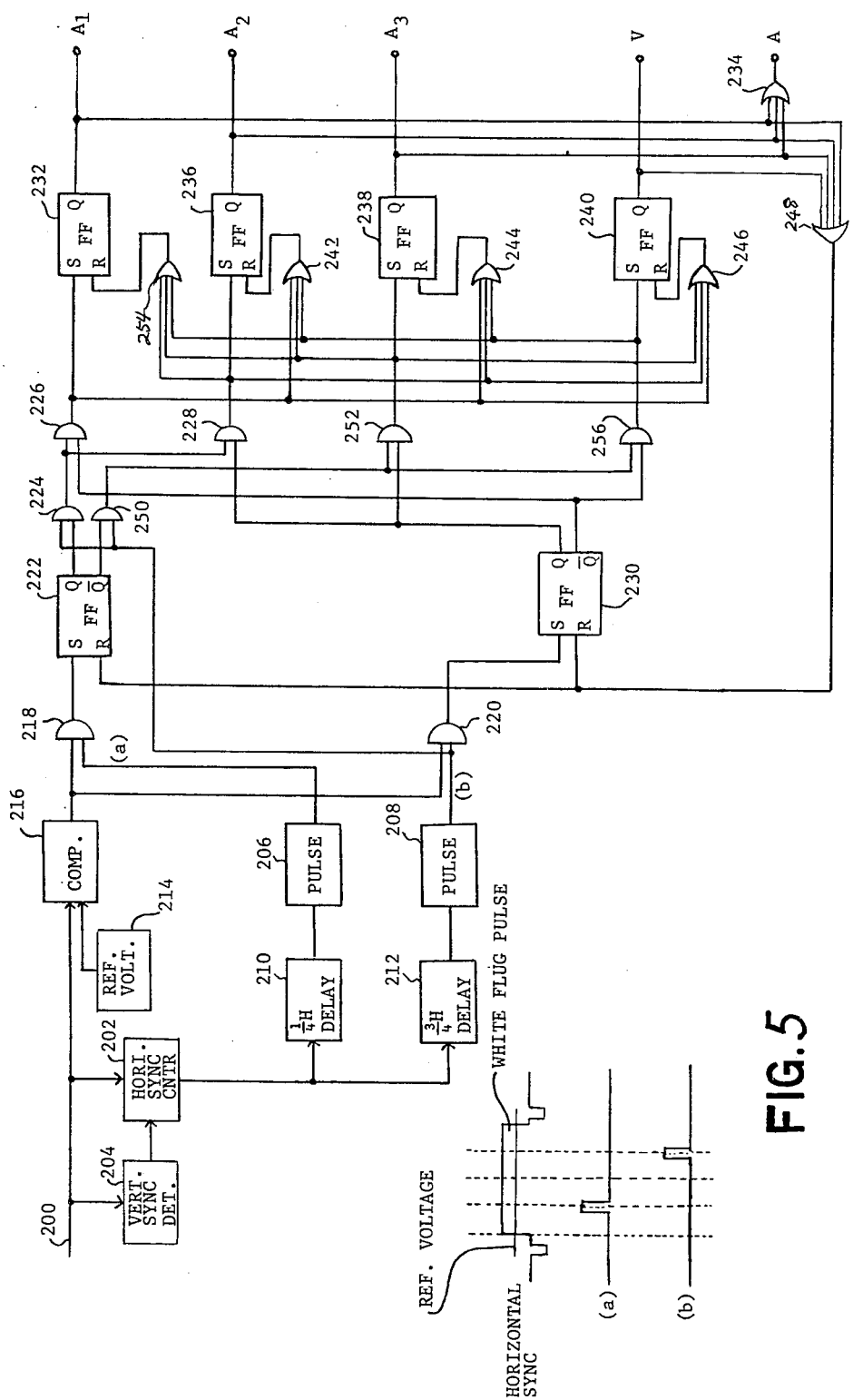
FIG. 5 is a brief block diagram of the decision circuit 36 in FIG. 4.

FIG. 5 is a logic diagram of one example of the combination of identification signal separating circuit 35 and decision circuit 36. In the combined circuitry of FIG. 5, the demodulated video format signal is received at terminal 200. The horizontal sync pulses are counted in counter 202 which is reset during each vertical blanking interval by a reset pulse from vertical sync detector 204. At a count corresponding to the 16$^{th}$ H interval, a signal is provided from counter 202 to pulse generators 206 and 208 through H/4 delay 210 and 3H/4 delay 212, respectively. Generator 206 will thus generate a short pulse during the first half of the 16H interval, and generator 208 will generate a short pulse during the second half of the 16H interval.

Reference voltage generator 214 provides comparator 216 with a reference voltage so that comparator 216 will provide an output to enable AND gates 218 and 220 whenever the voice identification signal is occurring. If the voice signal is stereo, a pulse from generator 206 will pass through gate 218 to set flip-flop (FF) 222 and thereby enable AND gate 224. The subsequent pulse from generator 208 will not pass through disabled gate 220 but will pass through enabled gate 224 to one input of AND gates 226 and 228. Assuming a reset state for FF 230, gate 226 will provide a set pulse to FF 232 which will then provide the stereo indication signal on line A1 and a voice control signal $A_0$ through OR gate 234 to switch 31 and memory control 43 as shown in FIG. 4.

The output of gate 226 will reset each of flip-flops 236, 238 and 240 through a respective OR gate 242, 244 or 246, and the output FF 232 will be supplied through OR gate 248 to reset each of flip-flops 222 and 230 to prepare for the next vertical blanking interval.

If the detected voice classification signal is bilingual, FF 222 will remain reset and AND gate 250 will be enabled. The pulse output from generator 208 will then pass through gate 220 to set FF 230, the output of which will enable each of AND gates 228 and 252, and the pulse output from generator 208 will also be provided through enabled gates 230 and 252 to set FF 238, which will provide a bilingual signal indication on output line A3 and voice control signal through gate 234 onto line $A_0$. FF 232 will be reset through OR gate 254, and FF's 236, 240, 222 and 230 will be reset as described before.

For monaural audio, pulses from generators 206 and 208 will both be passed through gates 218 and 220 to set respective FF's 222 and 230. The output from FF 222 will enable gate 224 and disable gate 250, while the output from FF 230 will enable gates 228 and 252 and disable AND gates 226 and 256. Accordingly, the pulse from generator 208 will pass through enabled gates 224 and 228 to set FF 236 which will provide a stereo indication on line A2.

This process will be repeated again at the next vertical blanking interval. If no voice identification signal is detected, neither of gates 218 or 220 will be enabled, and both of FF's 222 and 230 will consequently remain in their reset states. The pulse from generator 208 will therefore pass through enabled gates 250 and 256 to set FF 240 which will provide an image control signal V to cause the switch 37 (FIG. 4) to forward the received video format signal to the circuit 38. The output of gate 256 will also reset all of FF's 232, 236 and 238 and thereby terminate the Audio control signal $A_0$ at the output of gate 234.

The image reproduction processing circuit 38 comprises an image reproducing circuit 40 for generating a CRT driving signal according to the received video format signal, and a display 41 such as a CRT which displays an image according to the driving signal from the image reproducing circuit 40. On the other hand, the voice reproduction processing circuit 39 includes a memory control circuit 43 for forwarding a digital, time base compressed, video format voice information signal to a buffer memory 42 for storage. A time base-expansion circuit 44 receives the digital voice information from memory 42 via memory control 43, and subjects the digital signal to time base-expansion in accordance with the voice classification information received from decision circuit 36. The expanded voice information signal is then supplied only to a voice reproducing circuit 45 for monaural and for stereo or bilingual to both voice reproducing circuits 45, 46 which convert the supplied digital signal into an analog signal to drive speakers 47, 48 for voice reproduction.

As will be apparent from what has been described above, the video format signal recording/reproducing system according to this invention is capable of including the monaural, stereo or bilingual classification information in the voice frame identification signal representing the voice frame, and thus an identification for monaural, stereo and bilingual is obtainable via a comparatively simple device.

In the preferred embodiment as described above, the arrangement is such that the classification information for voice information is indicated according to width and position of the white flag pulse. However, the classification information can be indicated otherwise, e.g., according to the amplitude of the white flag pulse.

What is claimed is:

1. A method for recording a composite voice and image signal on a recording medium of a type wherein a voice field representing audio information and an image field representing video information are combined to form a sequence including image fields and voice fields and are subsequently recorded, with each field being separated from an adjacent field by a vertical blanking interval, each vertical blanking interval including a plurality of horizontal scanning intervals, and each field including a vertical blanking interval followed by an audio or image information signal, the improvement comprising the step of inserting a voice identification signal into a horizontal scanning interval of each said vertical blanking interval which immediately precedes an audio information signal, said voice identification signal further containing information specifying the type of sound represented by said audio information signal as being one of monural, stereo and bilingual.

2. The recording method according to claim 1, wherein said identification signal is a pulse having a constant amplitude, a width and time position of said pulse in said horizontal scanning interval representing said type of sound.

3. The recording method according to claim 1, wherein said identification signal is a pulse having a predetermined pulse width, and wherein an amplitude of said pulse represents said type of sound.

4. The recording method according to claim 1, including repeating at least some of said image fields.

5. A method for recording image and audio information signals in alternate sequence on a medium such as a video disc for later reproduction, which comprises the steps of:
   (a) providing an audio frame signal and an image frame signal in sequence to a switching circuit and a setting circuit;
   (b) generating a classification signal which indicates whether an audio frame signal or an image frame signal is being provided to said switching circuit and, if an audio frame signal, whether said audio frame signal is intended for monaural, stereo, or bilingual reproduction, said classification signal being provided to said setting circuit;
   (c) providing one of an audio and an image frame signal from the switching circuit to a compounding circuit in accordance with said classification signal;
   (d) detecting a vertical blanking interval preceding each of said audio and image frame signals provided to said setting circuit;
   (e) detecting horizontal periods of each of said audio and image frame signals provided to said setting circuit;
   (f) setting a counter to zero upon detection of said vertical blanking interval;
   (g) incrementing said counter by one unit for each horizontal period detected by said setting circuit;
   (h) providing said classification signal to an identification signal generator when said counter is incremented to a predetermined value within the range of horizontal periods comprising said vertical blanking interval;
   (i) processing said classification signal by said identification signal generator into an identification signal the format of which allows insertion of said identification signal into said vertical blanking interval while maintaining information carried by said classification signal to discriminate audio from image frame signals and, between said video frame signals, whether said audio frame signals are intended for monaural, stereo, or bilingual reproduction;
   (j) providing said identification signal by said identification signal generator to said compounding circuit;
   (k) inserting said identification signal by said compounding circuit into said vertical blanking interval preceding one of said image frame signal and audio frame signal provided to said compounding circuit;
   (l) providing said image frame signal and audio frame signal containing said identification signal to a processing circuit;
   (m) processing said image frame signal and audio frame signal by said processing circuit for recording onto a video disc; and
   (n) recording said image frame and audio frame on a video disc.

6. A method for reproducing image and audio information signals recorded in alternate sequence on a medium such as a video disc, which comprises the steps of:
   (a) reading sequentially recorded image and audio frame signals from a video disc;
   (b) processing said frame signals into a format such that said frame signals can be provided to a switching circuit and an identification signal separator circuit;
   (c) providing said frame signals to said switching circuit and to said identification signal separator circuit;
   (d) detecting a vertical blanking interval preceding each of said frame signals by said identification signal separator circuit;
   (e) detecting horizontal periods in each of said frame signals by said identification signal separator circuit;
   (f) setting a counter to zero upon detection of said vertical blanking interval;
   (g) incrementing said counter by one unit for each horizontal period detected by said identification signal separator circuit;
   (h) detecting an identification signal when said counter is incremented to a predetermined value within the range of horizontal periods comprising said vertical blanking interval;
   (i) providing said identification signal to a decision circuit;
   (j) processing said identification signal to determine classification information contained in said identification signal;
   (k) generating a control signal by said decision circuit to said switching circuit to provide said frame signal to one of an image reproduction circuit and an audio reproduction circuit according to classification information contained in said identification signal;
   (l) providing one of said frame signals to one of said image reproduction circuit and said audio reproduction circuit;
   (m) generating an audio control signal by said decision circuit to said audio reproduction circuit which directs said audio frame signal according to classification information contained in said identification signal;

(n) reproducing said image frame signal supplied to said image reproduction circuit from said switching circuit; and (o) reproducing said audio frame signal supplied to said audio reproduction circuit in one of a monaural, stereo, and bilingual sound made as directed by said audio control signal according to classification information contained in said identification signal.

* * * * *